This invention relates to guided electromagnetic wave transmission and, more particularly, to apparatus for propagation of the circular electric or $TE_{01}$ wave mode through wave guiding structures of circular transverse cross section.

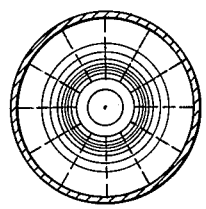
FIG. 1
TE$_{01}$
—— E
--- H
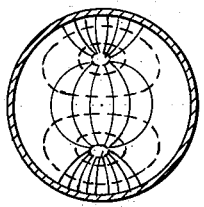
FIG. 2
TM$_{11}$
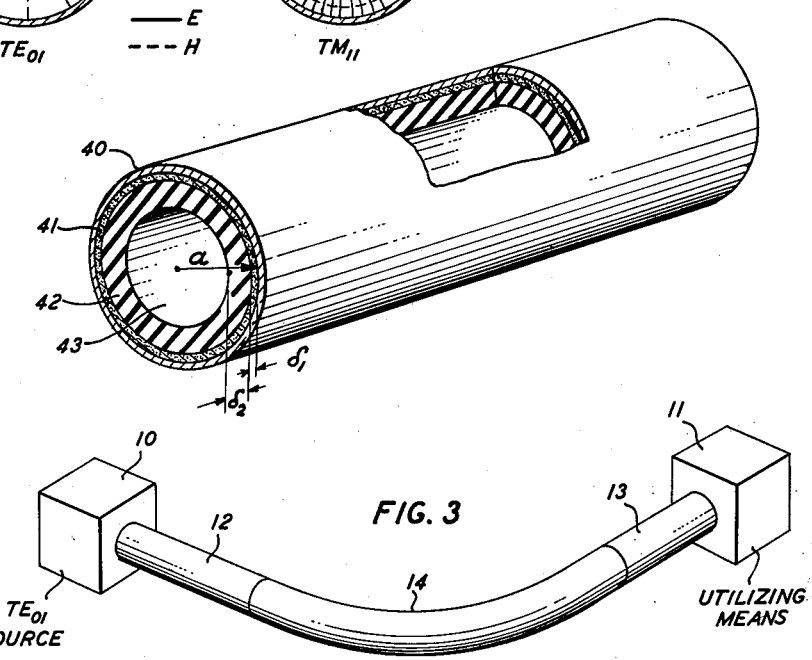
FIG. 4
FIG. 3
TE$_{01}$ SOURCE
UTILIZING MEANS
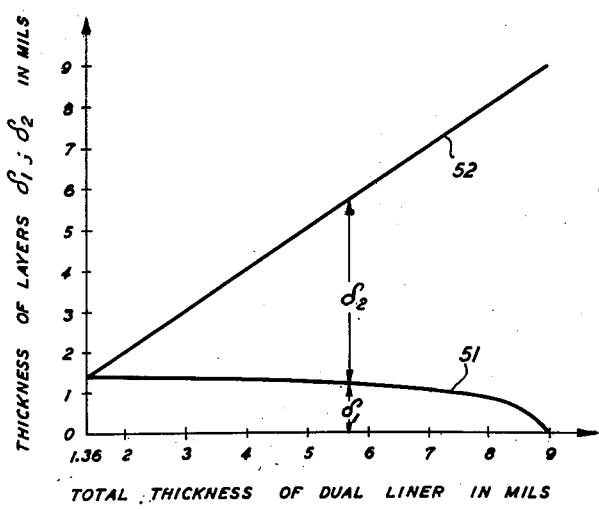
FIG. 5
TOTAL THICKNESS OF DUAL LINER IN MILS
INVENTOR
S. E. MILLER
BY
ATTORNEY 3,078,428
SPURIOUS MODE SUPPRESSING WAVE GUIDE
Stewart E. Miller, Middletown, N.J., assignor to Bell Telephone Laboratories, Incorporated, New York, N.Y., a corporation of New York
Filed Sept. 30, 1959, Ser. No. 843,452
6 Claims. (Cl. 333—95)

As is now well appreciated in the wave transmission art, the propagation of microwave energy in the form of $TE_{01}$ waves in wave guides of circular transverse cross section is especially suited to long distance transmission since the attenuation characteristic of this mode, unlike that of most other modes, decreases in magnitude with increasing frequency. Propagation of $TE_{01}$ waves in an ideal round wave guide which is perfectly straight, uniform, and conducting is essentially undisturbed. However, a major difficulty arises in conjunction with this mode of transmission from the fact that the $TE_{01}$ mode is not the dominant transmission mode in the hollow pipe round wave guide. Thus, slight imperfections in the guide itself and, more especially, any deviation from straightness of the longitudinal wave guide axis may excite waves of other modes and thus produce serious losses. These losses are due mainly to the fact that wave guide curvature induces coupling between the desired $TE_{01}$ and other wave transmission modes. One major conversion problem is that involving the $TE_{01}$ and $TM_{11}$ modes. Others involve the $TE_{01}$ and $TE_{12}$ modes as well as the $TE_{01}$ and other higher order modes.

The ease with which conversion to $TM_{11}$ occurs is explained by an equality, in perfectly conducting uniform round wave guide, between the phase constants of the $TE_{01}$ and $TM_{11}$ modes. United States Patent 2,744,945 issued December 18, 1956 to the present inventor, discusses a number of methods for transmitting circular electric waves in curved guides with small net conversion loss to unwanted modes.

One method of approach to the bend problem is to remove the degeneracy of, or equality between, the phase constants of the $TE_{01}$ and $TM_{11}$ modes through some modification of the wave guiding structure itself. Various methods for accomplishing this result have been suggested, among which are the use of an elliptical guide or one having a circularly corrugated wall. In addition, selective attenuation of the $TM_{11}$ wave mode may be afforded by use of a spaced conductive ring guide or of a closely wound conductive helix surrounded by a lossy sheath.

The copending application of H. G. Unger, Serial No. 681,054, filed August 29, 1957, now abandoned, discloses the use of thin dielectric liners in round wave guide to modify the $TM_{11}$ phase constant and thus to destroy the equality of these constants for the $TE_{01}$ and $TM_{11}$ wave modes. It has been found however, that for certain applications, the optimum liner thickness from the standpoint of minimizing $TE_{01}$ losses in the dielectric material while maximizing the effect of the liner on the $TM_{11}$ phase constants, does not permit performance of the deired standard.

Accordingly, it is a general object of the present invention to transmit the circular electric wave mode in round wave guide at substantially improved performance levels than those realizable heretofore.

A further obpect is to lower by improved means the tendency of $TE_{01}$ mode power to convert to $TM_{11}$ mode power in circular wave guides.

In accordance with the present invention, it has been discovered that a low-loss dielectric liner alone in a round wave guide does not adequately suppress $TM_{11}$ mode conversion for some applications. Furthermore, it has been found that attenuation of the unwanted modes by means of a guide liner of electrically lossy dielectric material was often undesirable since the thickness of the lossy liner which was necessary sufficiently to separate the phase constants for the $TE_{01}$ and $TM_{11}$ modes introduced prohibitive $TE_{01}$ mode losses. Accordingly, and in accordance with the present invention a thin lossy dielectric liner to attenuate unwanted modes within a round wave guide is overlaid with a lossless dielectric liner to remove the degeneracy of phase constants between the $TE_{01}$ and $TM_{11}$ wave modes. The resultant dual-liner composite structure incorporates both mode filtering and phase constant differential characteristics in a simple structure.

Thus, a more specific object of the invention is the introduction of both mode filtering characteristics and phase constant differentiating means into a round wave guide.

These and other objects, the nature of the present invention, its features and advantages will appear more fully upon consideration of the drawing and the detailed description thereof which follows.

In the drawing:

FIGS. 1 and 2 are illustrations of the electromagnetic field patterns of the $TE_{01}$ and $TM_{11}$ wave modes, respectively;

FIG. 3 is a perspective view of a simplified wave guide installation;

FIG. 4 is a perspective view of a round wave guide containing a composite liner in accordance with the invention; and FIG. 5 is a graphical representation of some performance characteristic of the apparatus of FIG. 4.

Referring more particularly to the drawing, FIGS. 1 and 2 illustrate the distribution of the electric and magnetic fields at a given instant in transverse cross sections of circular wave guides supporting the $TE_{01}$ and $TM_{11}$ transmission modes, respectively. The transverse electric $TE_{01}$ wave illustrated in FIG. 1 is commonly designated the circular electric wave mode inasmuch as the electric field, shown by the solid lines, consists of circular lines coaxial with the guide and lying transversely thereto with no longitudinal components. The magnetic field is described by the dashed radial pattern. It may be seen from the figure that the electric field intensity diminishes as the conductive boundary is approached and that the electric field has a low intensity in the vicinity of the interior surface of the wave guide.

The transverse magnetic $TM_{11}$ wave illustrated in FIG. 2 is described by a magnetic field, illustrated by dashed lines, lying entirely in planes transverse to the longitudinal axis of the guiding structure. The electric field pattern, indicated by the solid lines, has longitudinally extending components at the inner surface of the wave guide. Thus the $TM_{11}$ mode, in contradistinction to the $TE_{01}$ mode above described, has a substantial electric field intensity in the vicinity of the interior surface of the wave guide. The significance of this difference in field intensity at the wave guide surface will become apparent in a later portion of this specification.

FIG. 3 is a perspective view of a wave guide transmission system comprising microwave source 10 supplying energy in the form of $TE_{01}$ waves to a microwave utilizing means 11 through a continuous circular wave guiding passage. Utilizing means 11 may be a microwave amplifier, a receiver, or an antenna, for example. The wave guiding passage comprises uniform straight sections 12, 13 which are joined by smoothly curved section 14, which is a generalized representation of the wave guide curvature inherent in any long distance wave guide transmission system. This curvature may be intentional, for example, to follow rights of way, or it may occur as a result of elastic deformation of the guide under its own weight.

In a microwave system for the transmission of $TE_{01}$ waves, such as, for example, the system of FIG. 3, the inside radius $a$ of the circular pipe guide selected for the propagation of these waves must be greater than the critical or cut-off radius $a_c$ for the $TE_{01}$ mode at the frequencies of interest. The cut-off radius $a_c$ for $TE_{01}$ mode is equal to $0.61\lambda_0$ where $\lambda_0$ is the wavelength in free space of the lowest frequency wave in the transmission band. In practice $a$ is made greater than $a_c$ and may vary in different systems from $1.5\lambda_0$ to $15\lambda_0$. For illustrative purposes, a suitable inner radius for the wave guide structures to be described herein may be 7.7 $a_c$ or $4.7\lambda_0$. Thus, if a hollow pipe guide two inches in diameter were chosen for transmission of $TE_{01}$ waves, $\lambda_0$ in accordance with the above would be 0.213 inch or 5.4 millimeters.

The characteristic problem of moding between power in the $TE_{01}$ mode and power in the $TM_{11}$ mode arises because the phase constants, i.e., the phase velocities and wavelengths, of these two modes are substantially identical in hollow circular wave guides. Since the phase constants are nearly identical, these modes interact strongly in a manner analogous to coupled transmission lines as set out in an article by W. J. Albersheim entitled "Propagation of $TE_{01}$ Waves in Curved Waveguides" appearing in the Bell System Technical Journal, vol. 28, No. 1, January 1949. In the embodiments of the present invention which follow, the wave guide sections of the system of FIG. 3 are modified in a manner which both changes the phase velocity of the $TM_{11}$ wave relative to the $TE_{01}$ wave and introduces attenuation to the $TM_{11}$ and other unwanted wave modes. These modifications cause significant relative differences in the phase and attenuation constants between the $TM_{11}$ and other modes on the one hand and the $TE_{01}$ mode on the other hand. With the relative differences thus introduced, intermode coupling loss in wave guide sections in which $TE_{01}$ waves are propagating is substantially reduced.

FIG. 4 is a perspective view of a partially broken away section of hollow pipe wave guide of circular transverse cross section containing a composite liner in accordance with the present invention. Hollow conductive guide 40 is of inside radius $a$ which is selected to be above cut-off at the operating frequencies as set out above. Extending concentrically within guide 40 and disposed on its inside surface is liner 41 comprising a cylinder of electrically lossy material. As used in this specification, the term "electrically lossy material" will be understood to refer to those materials capable of converting into heat energy substantial amounts of the power incident thereupon as part of the electric field pattern of propagating electromagnetic waves. Lossy liner 41 has a radial thickness $\delta_1$ and is disposed within guide 40 such that the outer surface of the liner is contiguous with the inner surface of the guide. Recalling that the intensity of the electric field at the interior surface of a hollow conductive wave guide propagating the $TE_{01}$ mode differs from and is substantially less than that of a similar guide propagating the $TM_{11}$ and other higher order unwanted modes, it may be appreciated that the lossy liner 41 will have its major effect on the unwanted modes. Thus wave energy in these unwanted modes will be dissipated when propagating through a guide section containing liner 41 whereas the $TE_{01}$ mode will be only negligibly affected. Specifically the attenuation constants of the unwanted modes in the loaded guide section will be increased substantially more than the attenuation constant of the $TE_{01}$ mode. Liner 41 acts, therefore, as a mode filter. The real part of the permittivity, $\epsilon'$, associated with the material comprising lossy liner 41 should be as small as possible. In the art this quantity is often referred to merely as the dielectric constant of the material.

At the same time the loss factor of the lossy material, defined as the ratio of the imaginary to the real part of the permittivity of the material ($\epsilon''/\epsilon'$), should be of the order of $1/\sqrt{2}$ for the best mode filtering performance. As a specific example, liner 41 may comprise an acrylic ester polymer loaded with carbon. In general, discretion must be exercised in selecting the material of liner 41 since the majority of presently available lossy materials exhibit a dielectric constant which is too high to meet the loss factor criterion set out above.

As may well be appreciated, specification of a material with a low dielectric constant for liner 41 reduces its effect upon the phase constants of the unwanted modes. As set out above, provision of means to remove the phase constant equality between the $TM_{11}$ and $TE_{01}$ modes is essential to relieve straightness tolerances in wave guide installations. One method by which liner 41 could be made to introduce the desired phase constant differential is to increase its radial thickness. However, such an increase would cause the lossy material to extend into a region of substantial $TE_{01}$ electric field intensity. Consequently, the $TE_{01}$ mode would be attenuated to an undesirable degree.

Therefore, and in further accord with the invention, liner 42 of low-loss dielectric material is overlaid on the inside surface of lossy liner 41 to extend concentrically and contiguously therewith. Liner 42 has a radial thickness $\delta_2$ and comprises a material having a very low imaginary permittivity and a relatively high real permittivity, or dielectric constant. Since the electric field of the unwanted wave modes is greater than that of the $TE_{01}$ mode in the vicinity of liner 42, the effect of the liner is to "slow down" the propagation velocity and thereby change the phase constants of the unwanted modes to a much greater extent than the $TE_{01}$ mode. By thus increasing the phase constants of the unwanted modes over that of the $TE_{01}$ mode, the tendency of $TE_{01}$ waves to convert freely to $TM_{11}$ and other modes is reduced. The resulting composite dual liner structure provides an adequate phase constant differential between the $TE_{01}$ mode and other modes while at the same time selectively attenuating unwanted modes to the exclusion of $TE_{01}$.

The remainder of the transverse cross section of guide 40, consisting of the cylinder shaped area 43 is filled with a homogeneous low loss material different from the materials of liners 41 and 42. As shown in FIG. 4, area 43 comprises air, with a dielectric constant of unity.

When designing a doubly lined guide in accordance with the present invention, the dielectric constant of the low-loss liner 42 should be of moderate value while its loss factor should be as small as possible. The lossy liner 41 should have a dielectric constant as low as possible and a loss factor of the order of $1/\sqrt{2}$. The $TE_{01}$ loss then becomes a function merely of the relative radial thickness $\delta_1$ of liner 41 and $\delta_2$ of liner 42. The design situation is best demonstrated by a numerical example. For lossy layer 41, $\epsilon_1'=3$ and $\epsilon_2''=1.5$ is as close as present materials can approach the specified design rules. For low loss liner 42, $\epsilon_2'=2.5$ and $\epsilon_2''=2.5\times 10^{-3}$ are typical electrical properties of common low loss materials. By limiting the allowable added $TE_{01}$ loss caused by the liner to 20 percent of the ordinary $TE_{01}$ loss in plain pipe, a graphical plot of the effect of changing the relative thicknesses of the two liners may be made. Such a plot appears in FIG. 5.

In FIG. 5 total radial thickness of the dual liner is plotted in mils along the abscissa against actual radial thickness of each liner along the ordinate, also plotted in mils. The distance between the abscissa and curve 51 represents the radial thickness $\delta_1$ of lossy liner 41. The distance between curves 51 and 52 represents the radial thickness $\delta_2$ of low loss liner 42. For any point along curve 52, total $TE_{01}$ loss is 20 percent above that in plain pipe alone. FIG. 5 represents data obtained in a 2 inch inside diameter pipe operated at 55.5 kmc. with liners of the permittivities specified above. At the left side of the plot it is seen that a lossy layer alone of 1.36 mils thickness adds 20 percent to the $TE_{01}$ loss. On the other hand, at the right side of the plot, it is seen that a single low loss layer of 9 mils thickness is the maximum allowable under the 20 percent limitation. From evaluations of the unwanted mode losses as a function of relative liner thickness on the one hand and the relaxation of straightness requirements in installation of the guide on the other hand, a preferred design criterion of a total thickness of 5 mils was evolved. Thus, from FIG. 5 it may be seen that the preferred thickness ratio between the low loss and the lossy liners is approximately 3:1. It has been found that this preferred thickness ratio is substantially frequency insensitive. It may be the case however, that when materials which more nearly meet the ideal permittivity characteristics specified hereinabove for the lossy liner become available, this thickness ratio will change.

Wave guide devices embodying the dual liner, or composite, structure of the present invention may be fabricated in any one of several ways. One method consists of inserting hollow dielectric annuli into the guide. A second method involves the use of spiral tape which is first wrapped on a shaped mandrel and inserted with a given rotational motion into the guide. The mandrel is removed with a rotational motion opposite from that used in its insertion thereby releasing the wrapping. Such a method is disclosed in the above-mentioned abandoned application of H. G. Unger. A third method of fabrication consists of painting or spraying the respective liners on the interior of the guide. The relative thickness of the layers would be controlled by the length of spraying time.

In all cases it is understood that the above-described arrangement is merely illustrative of the many specific embodiments which can represent applications of the principles of this invention. Numerous and varied other arrangements can readily be devised in accordance with these principles by those skilled in the art without departing from the spirit and scope of the invention.

What is claimed is:

1. A transmission path for electromagnetic wave energy in the circular electric wave mode comprising a section of continuously conductively bounded hollow pipe wave guide of circular transverse cross section with a radius $a$, a first hollow liner of electrically lossy material with a first radial thickness disposed within said guide with the outer surface of said liner contiguous to the inner surface of said guide, and a second hollow liner of low loss material with a second radial thickness disposed within said guide with the outer surface of said second liner contiguous to the inner surface of said first liner, the remainder of the cross section of said guide being filled with a homogeneous lossless material differing from the material of said second liner, the total of said first and second radial thicknesses being only a small fraction of radius $a$.

2. Transmission means for the circular electric mode of electromagnetic wave energy comprising a section of hollow continuously conductively bounded pipe of circular transverse cross section, a first liner of radial thickness $\delta_1$ disposed within said pipe in contact with the inner surface thereof comprising material having a permittivity $\epsilon_1' - j\epsilon_1''$ with the ratio $\epsilon_1''/\epsilon_1'$ of the order of $1/\sqrt{2}$, a second liner of radial thickness $\delta_2$ disposed within said first liner in contact with the inner surface thereof comprising material having a permittivity $\epsilon_2' - j\epsilon_2''$ with the ratio $\epsilon_2''/\epsilon_2'$ substantially smaller than $1/\sqrt{2}$, the inner surface of said second liner being continuously exposed over its length to a homogeneous dielectric material different from the materials of said first and said second liners and having a radial thickness $\delta_3$ greater than the sum of $\delta_1$ and $\delta_2$.

3. In combination, a section of continuously conductively bounded hollow pipe wave guide of circular transverse cross section, means for applying electromagnetic wave energy in a circular electric wave mode to said section, first means for attenuating energy in wave modes other than circular electric wave mode disposed within said guide section in the transmission path for said circular electric wave mode, one longitudinally extending surface of said first means being contiguous to said continuously conductively bounded guide, and second means for increasing the phase constant of wave modes other than the desired circular electric wave mode disposed within said guide section in the transmission path for said circular electric wave mode, one longitudinally extending surface of said second means being contiguous to said first means, the remaining surfaces of said second means being continuously exposed to a homogeneous transmission medium which fills the remainder of said guide section.

4. The combination according to claim 3 in which said first means comprises a liner of electrically lossy material positioned at the inside surface of said guide, and said second means comprises a liner of low loss material positioned at the inside surface of said first liner.

5. The combination according to claim 4 in which said second liner has a radial thickness greater than the radial thickness of said first liner.

6. In combination, a section of continuously conductively bounded hollow pipe wave guide having a radius $a$ adapted to support circular electric wave modes, a liner of electrically lossy material having a first radial thickness disposed on the inner surface of said section, and a liner of low loss high dielectric material having a second radial thickness concentric with and contiguous to the inner surface of said lossy liner, the remainder of said guide being filled with a homogeneous dielectric material different from the materials comprising said liners and having a radial thickness greater than the sum of said first and second radial thicknesses.

References Cited in the file of this patent

UNITED STATES PATENTS

| 2,304,210 | Scott | Dec. 8, 1942 |
| 2,779,006 | Albershein | Jan. 22, 1957 |

FOREIGN PATENTS

| 751,322 | Great Britain | June 27, 1956 |

OTHER REFERENCES

Banos: "Propagation Characteristics . . . Dielectrics," published in Journal of Applied Physics, vol. 22, issue 2, pages 117–123, published February 1951.

Hosond: "The Transmission . . . Helix Waveguides," published in IRE Transactions on Microwave Theory and Techniques, pages 370–373, July 1959.